United States Patent
Clemens

(10) Patent No.: US 12,284,927 B2
(45) Date of Patent: Apr. 29, 2025

(54) COMPENSATING DEVICE FOR WORKING ON A SLOPE IN VITICULTURE

(71) Applicant: Clemens GmbH & Co. KG, Weinbautechnik-Getränketechnik, Wittlich (DE)

(72) Inventor: Bernhard Clemens, Greimerath (DE)

(73) Assignee: Clemens GmbH & Co. KG, Weinbautechnik-Getränketechnik, Wittlich (DE)

( * ) Notice: Subject to any disclaimer, the term of this patent is extended or adjusted under 35 U.S.C. 154(b) by 724 days.

(21) Appl. No.: 17/688,727

(22) Filed: Mar. 7, 2022

(65) Prior Publication Data
US 2022/0279696 A1  Sep. 8, 2022

(30) Foreign Application Priority Data
Mar. 5, 2021  (EP) .................................. 21161080

(51) Int. Cl.
*A01B 39/16* (2006.01)
*A01B 63/00* (2006.01)

(52) U.S. Cl.
CPC ............ *A01B 39/16* (2013.01); *A01B 63/002* (2013.01)

(58) Field of Classification Search
CPC ..... A01B 39/16; A01B 63/002; A01B 39/166; A01B 39/18; A01B 39/20; A01G 17/00
See application file for complete search history.

(56) References Cited

U.S. PATENT DOCUMENTS

| | | | | |
|---|---|---|---|---|
| 4,936,390 A * | 6/1990 | Anderson | ............ | A01B 39/166 172/111 |
| 4,936,391 A * | 6/1990 | Cameron | ............... | A01B 33/06 172/111 |
| 11,259,463 B1 * | 3/2022 | Leis | ..................... | A01D 34/006 |
| 2006/0048953 A1 * | 3/2006 | Rozendaal | ........... | A01B 61/046 172/35 |
| 2008/0195268 A1 * | 8/2008 | Sapilewski | ............ | G05D 1/027 701/23 |
| 2010/0070178 A1 * | 3/2010 | Wang | ................... | A01B 69/007 701/472 |
| 2015/0156950 A1 * | 6/2015 | Henry | .................... | A01B 51/04 172/664 |
| 2017/0359941 A1 * | 12/2017 | Czapka | .................. | A01B 63/14 |
| 2018/0049361 A1 * | 2/2018 | Zemenchik | ............ | A01B 63/28 |
| 2019/0261550 A1 * | 8/2019 | Damme | ............ | B60W 50/0097 |

FOREIGN PATENT DOCUMENTS

FR  2555860  6/1985

* cited by examiner

*Primary Examiner* — Keith D Bloomquist
(74) *Attorney, Agent, or Firm* — Lowe Graham Jones PLLC

(57) ABSTRACT

A machine for soil tillage to be arranged on a towing vehicle, wherein when the towing vehicle is travelling in a travel direction an area of soil can be tilled with a soil tillage tool in an intermediate space between at least two obstacles, wherein the machine has a control device with which the soil tillage tool is pivotable into and out of the intermediate space and/or is movable in a transverse direction towards or away from the machine into the intermediate space, wherein the control device comprises an adjusting device which causes the soil tillage tool to pivot in and out and/or to move in the transverse direction by an adjustment amount after detection of an obstacle.

15 Claims, 4 Drawing Sheets

COMPENSATING DEVICE FOR WORKING ON A SLOPE IN VITICULTURE

PRIORITY CLAIM

This application claims the benefit of priority from European Patent Application No. 21161080.3, filed Mar. 5, 2021, the contents of which is incorporated herein by reference in its entirety.

FIELD OF THE INVENTION

The invention relates to a machine for soil tillage to be arranged on a towing vehicle, wherein when the towing vehicle is travelling in a travel direction an area of soil can be tilled with a soil tillage tool in an intermediate space between at least two obstacles located to the side of the towing vehicle, wherein the machine has a control device with which the soil tillage tool is pivotable into and out of the intermediate space and/or is movable in a transverse direction towards the machine and/or away from the machine into the intermediate space, wherein the control device comprises an adjusting device which causes the soil tillage tool to pivot in and out and/or to move in the transverse direction by an adjustment amount after detection of an obstacle.

BACKGROUND OF THE INVENTION

Machines of this type are used predominantly in agriculture, but in particular in fruit cultivation and viticulture, or in the cultivation of row crops.

In fruit cultivation and viticulture it is necessary to till areas of soil between plants and preferably between plants in row crops. In order to facilitate the tillage of the areas of soil with an agricultural vehicle which travels parallel to the row crops, the agricultural vehicle actuates a machine such as has been previously described. The ability of the soil tillage tool to pivot back when an obstacle is detected prevents the soil tillage tool from colliding with the plants of the row crops or with other obstacles.

The soil tillage tool is preferably arranged as a lateral arm of the machine. The soil tillage tool is preferably either directed away from the vehicle, or, as for example in the case of high clearance tractors, the soil tillage tool is guided along below the machine. This means that an area of soil adjacent to at least one route of the agricultural vehicle can be tilled by the soil tillage tool. This area of soil is in particular an area of soil between two plants of a row of plants of the row crop. Many plants, in particular grapevines, but also other fruit crops, are very sensitive to the soil tillage tool running into the plant stems. Running into the plant stems is prevented by the obstacle recognition and the pivoting back of the soil tillage tool when an obstacle is recognized. Thus damage to the root system of the plant by the soil tillage tool is also prevented. As a rule the obstacle recognition takes place by a sensor ahead of the soil tillage tool which recognizes an obstacle and thus triggers the pivoting back of the soil tillage tool. After passing the obstacle, or after a certain time which at constant speed of travel corresponds to a specific distance, the soil tillage tool automatically pivots back into its starting position.

Machines such as are known from the prior art reach their limits when travelling on ground with a lateral slope inclination in relation to the transverse direction of the vehicle. Since plants always grow parallel to a vertical direction which arises from the center of the earth, they do so even on ground having a slope inclination. As a result an angle is produced between the plant and the normal of the ground having a slope inclination. By the effective oblique position of the plants by comparison with the machine, it can happen that the sensor, which in the transverse direction is preferably the same length as the soil tillage tool, now runs closer to or further away from plants than the soil tillage tool. The basis for this is that due to the inclined position of the plants the transverse direction no longer extends orthogonally to the vertical direction and thus the distance from the fastening point of the obstacle sensor on the axis of rotation D to the obstacle is longer and/or shorter than the distance from the fastening point of the soil tillage tool on the axis of rotation D to the obstacle. As a result, on the side of the machine (hill side) facing the slope in the transverse direction it is possible that in the worst case a plant is not even detected, wherein the soil tillage tool already contacts this plant, or the soil tillage tool passes too close to the plant and thus does not maintain a safe distance from the plant. On the side of the machine (valley side) facing away from the slope in the transverse direction it is possible that the sensor is a lesser distance from the plant than the soil tillage tool and thus the soil tillage tool is guided too far away around the plant and as a result the area around the plant is not tilled effectively.

In the document FR 2 555 860 A1 a system is already disclosed in which an obstacle sensor can be set manually, so that it can be shifted further forwards or backwards in the travel direction with respect to the soil tillage tool. As a result a soil tillage tool can be guided at a lesser distance around plants in the row crop and as a result the area of soil which is not tilled between plants can be minimized. However, the adjustment of the obstacle sensor takes place mechanically and manually and accordingly always has to be readjusted as the slope changes, which is not satisfactory in particular bearing in mind the time required for adjustment.

Therefore the object of the invention is to provide a machine by which soil tillage is possible between plants in row crops arranged parallel to the travel direction, without there being a risk of a collision between a soil tillage tool and a row crop in the event of lateral slope inclinations and preferably also all areas between the plants can be tilled as efficiently as possible. This object is achieved by a device according to claim 1 and a method for controlling a soil tillage tool according to claim 12.

SUMMARY OF THE INVENTION

The invention relates to a machine for soil tillage to be arranged on a towing vehicle, wherein when the towing vehicle is travelling in a travel direction an area of soil can be tilled with a soil tillage tool in an intermediate space between at least two obstacles, wherein the machine has a control device with which the soil tillage tool is pivotable into and out of the intermediate space and/or is movable in a transverse direction towards the machine and/or away from the machine into the intermediate space, wherein the control device comprises an adjusting device which causes the soil tillage tool to pivot in and out and/or to move in the transverse direction by an adjustment amount after detection of an obstacle. According to the invention the control device further includes a regulating device which assigns an adjustment amount to a value measured by a position sensor and transmits this adjustment amount to the adjusting device, wherein the value measured by the position sensor is an angle of inclination which corresponds to a slope angle, which exists between the transverse direction and a horizontal plane, wherein this horizontal plane exists orthogonally to a perpendicular vertical direction, which arises from the center of the earth, or which angle corresponds to a plumb angle which exists between the vertical direction and a height direction perpendicular to the transverse direction.

The invention is characterized in that the control device further includes a regulating device which assigns an adjustment amount to a value measured by a position sensor and transmits this adjustment amount to the adjusting device, wherein the value measured by the position sensor is an angle of inclination which corresponds to a slope angle, which exists between the transverse direction and a horizontal plane, wherein this horizontal plane exists orthogonally to a perpendicular vertical direction, which arises from the center of the earth, or which angle corresponds to a plumb angle which exists between the vertical direction and a height direction perpendicular to the transverse direction.

On the basis of the orthogonality of transverse direction and height direction as well as the orthogonality of vertical direction and the horizontal plane, the terms slope angle and plumb angle relate to the same angle value. Only the reference point of the measurement is different. Therefore in the context of this patent application, in the case of a measurement of the slope angle or plumb angle it is also always conceivable to measure the respective other angle.

Due to the regulability of the adjustment amount during a soil tillage run, the adjustment amount can be adapted at any time to the current slope angle. According to the invention the regulation of the adjustment amount is carried out automatically on the basis of a sensor value during the soil tillage run and therefore requires no manual actuation of a switching element. This means that the soil tillage does not have to be interrupted for re-regulation of the adjustment amount and the operator the machine does not have to carry out any manual regulation by means of a switching element.

During the pivoting movement the soil tillage tool rotates around an axis of rotation running parallel to a height direction of the machine, wherein the soil tillage tool is pivoted back, opposite to the travel direction, out of the transverse direction perpendicular to the travel direction and perpendicular to the height direction. Alternatively in this connection it is conceivable that instead of the pivoting movement a linear movement of the soil tillage tool takes place towards the machine. In this variant the soil tillage tool is preferably moved in the transverse direction and out of its position as an arm towards the machine. In this case it is also conceivable that the soil tillage tool is drawn into the machine. Moreover, a combination of pivoting and linear movement of the soil tillage tool is conceivable. When reference is made below to a pivoting back or a pivoting movement of the soil tillage tool, an alternative linear movement or a combination of linear and pivoting movement is also always conceivable.

The soil tillage tool preferably comprises a share which, by undercutting the surface of the earth, turns weeds over and thus effectively combats them. Depending upon the field of application, undercutting of the surface of the earth by up to 250 mm can take place. The soil tillage tool can preferably also comprise further tool components; possible components would be for example rotary heads, ploughs or cultivators, but all other types of known tool components and tool combinations are conceivable.

The soil tillage tool in the turned-back state preferably tills a narrower area of soil (measured along the transverse direction) than in the starting position. Due to the pivoting back of the soil tillage tool to the machine and/or the movement to and fro of the plants of the row crop (considered along the transverse direction), the narrower area of soil is located directly alongside the route of the machine, but is spaced apart from the planted rows with respect to the transverse direction. Thus a collision between the soil tillage tool and the plants of the planted rows is effectively prevented.

Moreover, it is conceivable that the soil tillage tool stops the soil tillage, and that it is turned back. In this embodiment the soil tillage tool preferably continues the soil tillage and also returns to its starting position.

According to at least one further embodiment the control device comprises a moving device by which the soil tillage tool can be pivoted and/or can be moved in the transverse direction. Furthermore, the control device comprises a signal generator which can be controlled by the adjusting device and by which the moving device can be controlled, wherein the signal generator is merely connected indirectly via the adjusting device to the obstacle sensor. Thus the signal of the obstacle sensor is always first transmitted to the adjusting device and then to the control means of the soil tillage tool, consisting of the signal generator and the moving device. The adjusting device determines an adjustment amount which corresponds to a distance by which the soil tillage tool is pivoted in the transverse direction Q after detection of an obstacle and/or is moved in the transverse direction. The actuation signal is then transmitted to the signal generator, which pivots and/or moves the soil tillage tool in the transverse direction according to the adjustment amount. In this case the signal generator is preferably designed as a solenoid valve. The moving device is preferably a single- or double-acting hydraulic cylinder, but it is also conceivable to use other pivot drives, such as for example a servomotor, a radial piston motor or similar drives. When a servomotor is used as the moving device a corresponding signal generator would be a motor controller.

According to at least one further embodiment the moving device of the control device can also actuate a tilting device by which the axis of rotation can be oriented at an angle, but preferably parallel to the vertical direction. In fact in this case the moving device is preferably designed as an adjustment element of the tilting device. The adjustment element is preferably designed so that a contraction or extension in longitudinal direction of the adjustment element is possible. As a result the amount by which the machine or the soil tillage tool is pivoted about the tilting axis would preferably be fixed. It is conceivable that, by the tilting of the axis of rotation out of the height direction in a parallel direction to the vertical direction, the problem of the different distances of the obstacle sensor and soil tillage tool from the obstacle is solved, since due to the tilting the obstacle sensor and the soil tillage tool again run orthogonally to the vertical direction. Since the obstacle sensor and the soil tillage tool preferably project by the same distance from the axis of rotation to the obstacle, they are both the same distance from the obstacle due to the tilting of the axis of rotation in a parallel direction to the vertical axis.

According to at least one further embodiment the slope angle or plumb angle can be continuously measured by the position sensor, so that the adjustment amount is automatically and continuously adjustable by the regulating device depending upon the slope angle or plumb angle. Accordingly, the setting of the adjustment amount takes place fully automatically according to the slope angle or plumb angle continuously detected by the position sensor. An adjustment amount is then continuously assigned by the regulating device to the temporally continuously detected slope angle or plumb angle. Thus it is ensured that at any time the optimal adjustment amount is set in the adjusting device. As a result a collision of the soil tillage with an obstacle is particularly effectively avoided. The position sensor can be designed as an angle sensor, as a gyro sensor or also as a GPS-based sensor, but in principle any other suitable measurement of the slope angle or plumb angle is conceivable. Any digital triangulation system for determining positions is preferably used.

It is conceivable that the regulating device determines the adjustment amount in accordance with data from a database. In this embodiment the database would contain at least one inclination profile of the area on which the plants are located. Corresponding data from the database can preferably also be approximated in order to obtain a more precise value between two measurement points.

It is conceivable that the step of assigning an adjustment amount to a slope angle can be continuously carried out by the regulating device within a time period. The adjustment amount preferably corresponds to a distance in the transverse direction by which the soil tillage tool is more or less pivoted and/or moved. It is conceivable that a lower limit of the adjustment amount is zero centimeters, wherein at this value, when an obstacle is detected, the soil tillage tool remains in its starting position and is not pivoted and/or moved towards the machine. From this low value any positive value can preferably be set continuously. It is conceivable that the adjustment amount on the side (valley side) facing away from the slope is always smaller than on the side (hill side) facing the slope. The maximum adjustment amount preferably corresponds to the value by which the soil tillage tool can be pivoted and/or moved to a maximum extent in the transverse direction.

According to at least one further embodiment, in addition to the signals of the position sensor and of an obstacle sensor also the current speed of travel of the vehicle, the current position of the soil tillage tool, as well as a distance between the machine and the obstacles in the transverse direction Q are detected in the control device, wherein the distance between the machine and the obstacles is preferably measured by a suitable distance sensor. This distance value is preferably taken into consideration during control of the moving device. It is conceivable that in addition to the slope angle correction the distance of the vehicle in the transverse direction to the row crop also plays a part in the determination of the adjustment amount. In a machine which travels closer past a row crop on one side than on the other side, the soil tillage tool must preferably be pivoted back further on the side with which it travels closer to the row crop than on the side where the plants are further away from the machine.

In addition it is possible to store a distance value, wherein this distance value is a fixed value which defines the distance before a detected obstacle at which the soil tillage tool should be pivoted back. Preferably this distance value likewise defines the distance after a detected obstacle at which the soil tillage tool is to be pivoted in again into the area between two obstacles. The current position of the soil tillage tool preferably also includes a depth of insertion of the soil tillage tool into the soil, in other words the undercutting depth.

On the basis of all information the regulating device determines a current adjustment amount which is then set in the adjusting device. Thus it is ensured that the pivoting back always takes place at the required optimal distance from the obstacle. The pivoting back of the soil tillage tool preferably takes place in the transverse direction only partially, depending upon the type of signal of the obstacle sensor. As a result it is preferably ensured that the soil tillage tool is guided past only as far away from the obstacle as is necessary to avoid a collision. In this embodiment the control device also detects the position of the soil tillage tool and the type of obstacle sensor signal (for example the angle of deflection in a rotatable feeler rod). It is conceivable that the current rotation angle of the soil tillage tool is also measured by means of an angle encoder.

According to at least one further embodiment the adjusting device can be regulated by a switching element which can be actuated manually during the soil tillage run, and the adjusting device is designed as an electronic control system. The adjusting device is preferably designed to be electronic, wherein a hydraulic design is also conceivable. The switching element is preferably arranged in a driver's cab of the vehicle and the value set by the switching element corresponds to an angle set value on the regulating device. Thus the operator of the soil tillage machine can actuate the switching element during the travel and can manually set a value which corresponds to a lateral angle of inclination and accordingly to a corresponding slope angle.

In a preferred embodiment the switching element is designed as a rotary or slider control. However, a purely electronic design of the regulator is conceivable, for example as a touchscreen.

According to at least one further embodiment the obstacle sensor is designed as a mechanical feeler, wherein an obstacle is detected when a minimum actuation of the feeler is exceeded.

According to at least one further embodiment the feeler is designed as a rod which is rotatable from the travel direction into the transverse direction and parallel to the ground, wherein the minimum actuation corresponds to a minimum angle of rotation about the axis of rotation of the feeler and of the soil tillage tool. The mechanical feeler preferably runs ahead of the soil tillage tool, wherein the lead is considered in relation to the direction of travel. The lead of the rotatable rod can preferably be set by means of a perforated disc with locking bolt. The distance around an obstacle which is not tilled during a soil tillage run can be set by means of the lead, wherein this distance is also designated as an untilled island. Due to the lead of the feeler the position of the island is preferably changed, wherein the distance on one side (for example in front of the obstacle) is reduced by the amount of the increase in the distance on the other side of the obstacle (for example after the obstacle). The adjusting device ensures that the distance from the obstacle is maintained even in a lateral slope position. The embodiment of the obstacle sensor as a mechanical feeler or as a rotatable rod represents a particularly simple and proven as well as robust embodiment of the obstacle sensor.

According to a further embodiment the obstacle sensor is designed as a contactless sensor. The contactless sensor is preferably an ultrasonic sensor, a reflected light switch, a laser sensor, a 3D laser sensor, a camera system or a digital triangulation system for determining positions with stored card data. In this case, however, further contactless sensor systems are conceivable. Due to the embodiment of the obstacle sensor as a contactless sensor, contact with the obstacles is completely avoided. This can be advantageous in particular in fruit row crops, since several fruit plants react particularly sensitively to being hit. Also fragile devices such as thin rods or wires which are used for cultivation of the plants in rows, and likewise represent obstacles, are protected.

According to a further embodiment the soil tillage tool and the obstacle sensor are fastened to the axis of rotation, resulting in a distance A which describes the spacing between a fastening point of the obstacle sensor on the axis of rotation and an obstacle, and a distance B, which describes the distance between a fastening point of the soil tillage tool on the axis of rotation and an obstacle. Accordingly, the soil tillage tool and the obstacle sensor pivot preferably about the same axis of rotation, wherein the obstacles are in each case plants of the row crop growing in the vertical direction.

According to a further embodiment, in row crops which grow parallel to the vertical direction a slope angle brings about a path difference from the distance A to the distance B, wherein the adjustment amount is determined by the regulating device, so that it compensates for this path difference. It is conceivable that, on the side of the machine which faces the slope in the transverse direction (valley side), the distance A is less than the distance B, and that, on the side of the machine which faces the slope in the transverse direction Q (hill side), the distance A is greater than the distance B. Accordingly on the hill side it is necessary to increase the adjustment amount. Alternatively, the adjustment amount is preferably decreased on the valley side, since the soil tillage tool is further away from obstacles than the obstacle sensor.

Moreover, the invention is characterized by a method for controlling a soil tillage tool of a machine according to at least one of the preceding embodiments. The method comprises the following steps:
  a. setting the adjustment amount by which, when an obstacle is detected during a soil tillage run, the soil tillage tool is pivoted by means of the moving device and/or is moved in the transverse direction;
  b. detecting an obstacle by the obstacle sensor;
  c. pivoting out and/or moving the soil tillage tool in the transverse direction to the machine out of the intermediate space depending upon the adjustment amount;
  d. pivoting in and/or moving the soil tillage tool in the transverse direction from the machine into the intermediate space by the control device.

According to the invention, due to the regulating device the determination of the adjustment amount during a soil tillage run is possible at any time, regardless of whether or not an obstacle has been detected after the last setting. Thus it is conceivable that the step a is initially carried out multiple times before the steps b to d are carried out. On the other hand it is also conceivable that, after the steps b to d have been carried out, the steps b to d are carried out multiple times one after the other before the step a is carried out again.

According to a preferred embodiment a slope angle or plumb angle is continuously measured by the position sensor and the adjustment amount is continuously determined automatically by the regulating device depending upon the slope angle or plumb angle. In this case the slope angle or plumb angle measured in each case is preferably transmitted to the regulating device in the control device and then an adjustment amount is assigned to the current slope angle or plumb angle by the regulating device. The adjustment amount thus determined is then transmitted to the adjusting device and thus the adjustment amount is set automatically in the adjusting device depending upon the measured slope angle or plumb angle, wherein the adjusting device then informs the signal generator about the amount by which it must move the moving device.

According to a preferred embodiment the signal from the position sensor is denoised with at least one filter in order to be able to distinguish uneven ground from an actual change in the slope angle. This preferably takes place with automatic and/or continuous determination of the adjustment amount by the regulating device, since in the event of high dynamics of the system small uneven surfaces would already ensure that the adjustment amount is constantly changed and thus a rebound of the system can ensue. The sensor signal is preferably smoothed temporally in amplitude. It is also conceivable that the intensity of the smoothing can be set in order to adapt the dynamics of the system to the particular application and/or ground.

According to a preferred embodiment, by comparison with the set adjustment amount during travel on level ground, during travel with a lateral slope angle the adjustment amount on the valley side is decreased with the aid of the regulating device and on the side facing the hill the adjustment amount (S) is increased with the aid of the regulating device (11). This manner of determining the adjustment amount ensures that, for each slope inclination, the soil tillage tool is pivoted back with a constant distance of the soil tillage tool from the obstacle.

Further advantages, aims and properties of the present invention are explained with reference to the following description of the attached drawings. Similar components can have the same references in the various embodiments.

BRIEF DESCRIPTION OF THE DRAWINGS

Preferred and alternative examples of the present invention are described in detail below with reference to the following drawings.

DETAILED DESCRIPTION OF THE PREFERRED EMBODIMENT

Figure 1:
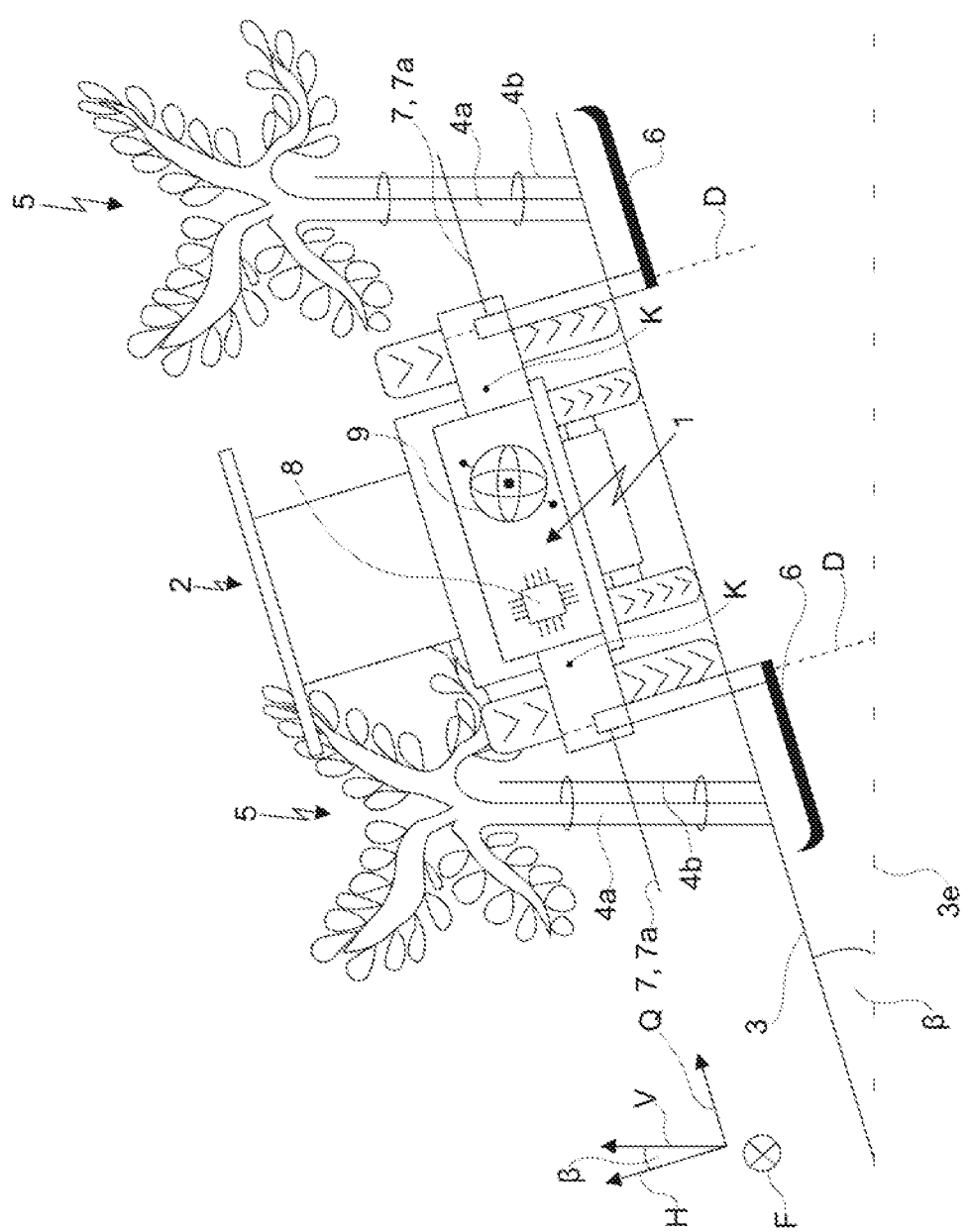
FIG. 1 is an overview representation of the machine 1 arranged on a vehicle 2 during soil tillage in a row crop 5 as viewed in the travel direction from the rear.

FIG. 1 shows the machine 1 which is arranged behind an agricultural vehicle 2 in the travel direction F during the soil tillage. In this case the travel direction F is represented in FIG. 1 in so far as it is directed into the drawing. The agricultural vehicle 2 is preferably any agricultural towing vehicle 2, particularly preferably a tractor, in particular a hauler, a narrow-track tractor, a high-clearance tractor, a crawler, a unimog or an equipment carrier. The machine 1 is moved over the soil 3 by the agricultural vehicle 2. In this case this soil 3 is tilled by the machine 1 with the aid of the soil tillage tool 6.

Moreover, in FIG. 1 the relationship between the plants 4*a* of a row crop 5 growing in the vertical direction V with the associated planting sticks 4*b* and the height direction H can be recognized, wherein the height direction H runs perpendicular to the soil 3 and thus also perpendicular to the transverse direction Q running parallel to the soil 3. As a result, between the height direction H and the vertical direction V the slope angle ß exists exactly as it exists between the soil 3 and a horizontal plane 3*e*, wherein the horizontal plane 3*e* in turn exists orthogonally to the perpendicular vertical direction V.

Furthermore, in FIG. 1 the position of the soil tillage tool 6 and of the obstacle sensor 7 is shown in relation to the plants 4a and the planting sticks 4b. It can be seen that in this embodiment the soil tillage tool 6 and the obstacle sensor 7 are arranged on the same axis of rotation D, but at different positions in the height direction H. The representation in FIG. 1 is limited to the essential elements of the invention. However, it is conceivable that the machine 1 contains further machines such as supporting wheels, additional tools for pre- and/or post-processing, or other devices known from agriculture.

Moreover, FIG. 1 also shows the tilting axis K about which the axis of rotation D can preferably be tilted in order are being may in order thereby to be preferably oriented parallel to the vertical direction V.

Figure 2:
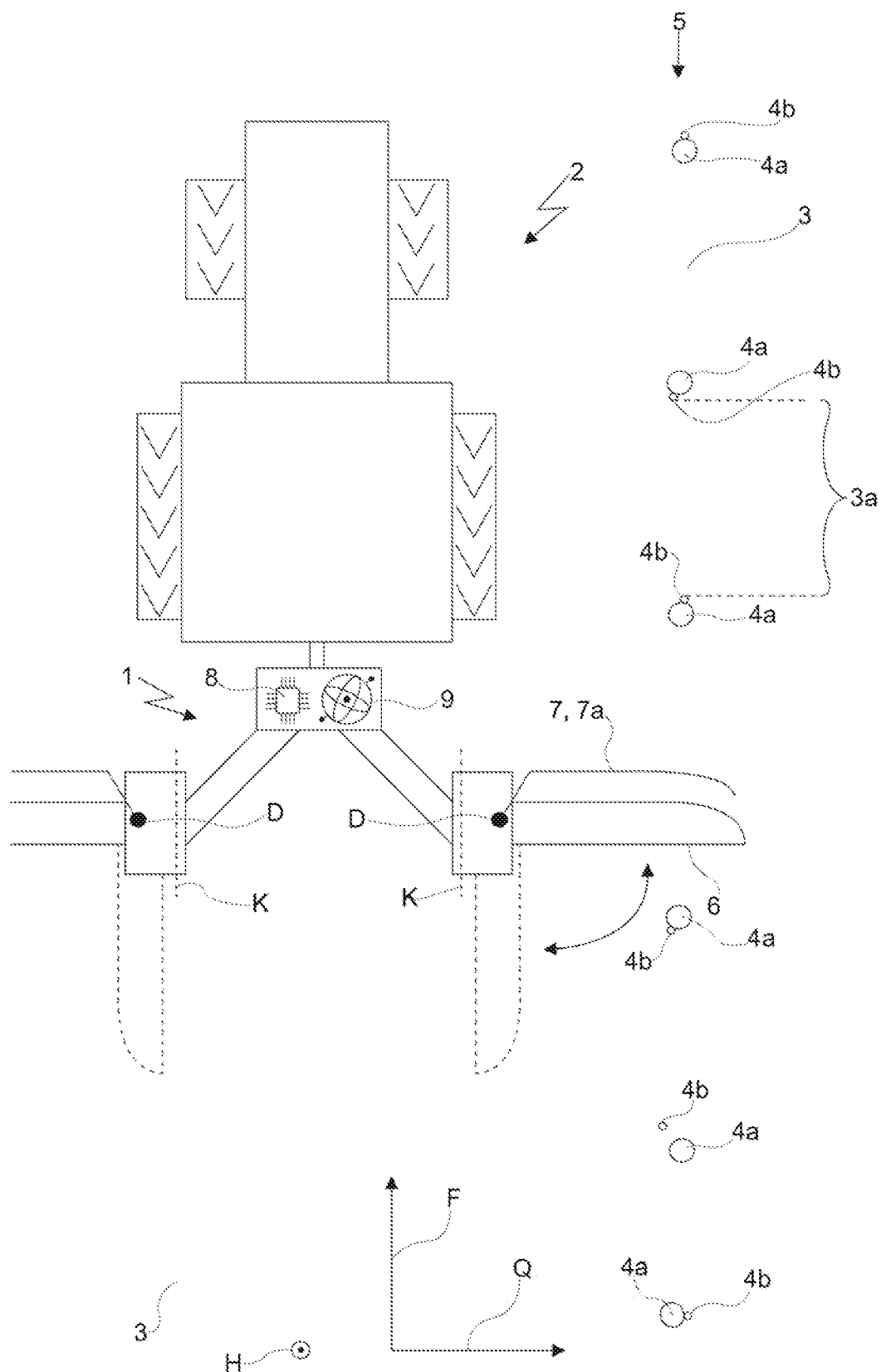
FIG. 2 is an overview representation of the machine 1 on a vehicle 2 during soil tillage in a row crop 5 in plan view.

FIG. 2 shows the same embodiment of the agricultural vehicle 2 with the machine 1 in a plan view; wherein in the illustrated embodiment the agricultural vehicle 2 pulls the machine 1 and thus the soil tillage tool 6 in the travel direction F. However, it is also conceivable that the machine 1 is arranged in front of or to the side of the agricultural vehicle 2. Thus the machine 1 can be arranged at the front, at the rear and/or between the axles of the vehicle 2.

In the plan view illustration in FIG. 2 it can be seen that the soil tillage tool 6 is arranged as a lateral arm in the transverse direction Q of the machine 1. As a result soil tillage by the soil tillage tool 6 is possible alongside the route of the agricultural vehicle 2. In particular it is possible that as the agricultural vehicle 2 travels along a row crop 5 an area of soil 3a between the plants 4a can be tilled by the soil tillage tool 6. However, in order not to damage the plants 4a it is necessary to pivot the soil tillage tool 6 out of the area between the plants 3a before a collision with a plant 4a or any other obstacle 4.

The pivoting of the soil tillage tool 6, which is arranged projecting out of the machine 1 as a lateral arm in a transverse direction Q, takes place by rotation thereof about the axis of rotation D out of the transverse direction Q towards the rear in the direction opposed to the travel direction F. In this case the axis of rotation D is arranged parallel to a height direction H and preferably orthogonally to the tilting axis K. The height direction H is perpendicular to the soil 3, and thus constitutes the soil normal, and in FIG. 2 is directed upwards from the soil 3 and out of the drawing. The tilting axis K preferably extends parallel to the travel direction F and is preferably capable of rotating the soil tillage tool 6 about the tilting axis K. Thus the resulting tilting movement preferably takes place in the plane which is spanned by the height direction H and the transverse direction Q.

In order to ensure that the soil tillage tool 6 pivots out of the area of soil 3 in good time before the contact with an obstacle 4, an obstacle sensor 7 is arranged in front of the soil tillage tool 6 in the travel direction F. The obstacle sensor 7 is designed either as a mechanical feeler 7a or as a contactless sensor (not shown here). In the embodiment illustrated here the axis of rotation D of the soil tillage tool 6 coincides with the axis of rotation D of the mechanical feeler 7a. However, it is also conceivable that there are separate axes of rotation. In this case the two axes of rotation are preferably parallel to one another.

By the arrangement of the obstacle sensor 7 in front of the soil tillage tool 6 in the travel direction the obstacle sensor 7 is capable of recognizing an obstacle 4 before the soil tillage tool 6 comes into contact with the obstacle 4. Thus the soil tillage tool 6 can be pivoted, contrary to the travel direction F and thus towards the rear, out of the area of soil 3a between obstacles 4 in good time before contact with the obstacle 4. The machine 1 then passes the obstacle 4 with a soil tillage tool 6 (dashed lines in FIG. 2) in the pivoted-back state. After the machine 1 with the soil tillage tool 6 has passed the obstacle 4, the soil tillage tool 6 pivots again automatically into the area of soil 3a between the obstacles 4 and thus again assumes the starting position as a lateral arm of the machine 1. Thus the area of soil 3a in front of and behind the obstacle 4 is tilled, wherein a certain area around the obstacle 4 remains untilled.

Figure 3A:
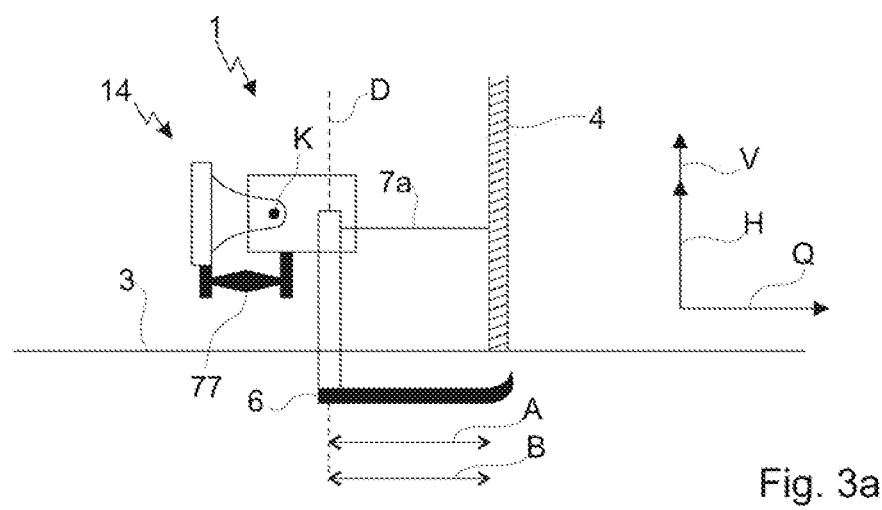
FIGS. 3*a*-3*c* are schematic representations of the soil tillage tool 6 and the obstacle sensor 7 of the machine 1 during soil tillage with a lateral slope position.
Figure 3B:
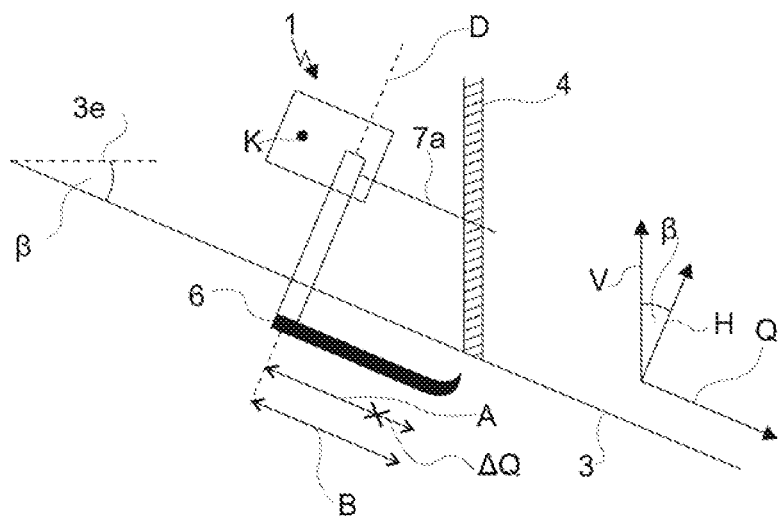
Figure 3C:
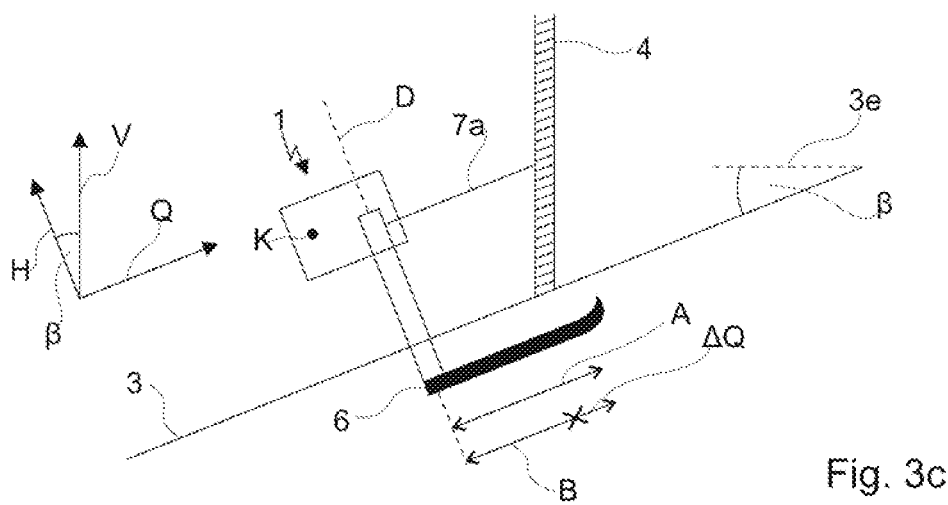

FIGS. 3a to 3c illustrate the problem which arises when a slope angle is ≠0° the transverse direction Q. FIG. 3a shows a soil tillage tool 6 and an obstacle sensor 7 when travelling in the travel direction F on ground 3. FIG. 3a shows the soil tillage tool 6 as it reaches an obstacle 4 in the moment immediately before the soil tillage tool 6 pivots back out of the starting position. For clarification of the underlying problem in FIGS. 3a to 3c, the obstacle sensor 7, which is shown here by way of example as a mechanical feeler 7a, has the same length in the transverse direction Q as the soil tillage tool 6. For better illustration, the distal end of the feeler 7a when viewed from the machine 1 is as far away from the machine in the transverse direction Q as the obstacle 4. This results in a distance A and a distance B, wherein the distance A describes the distance from the fastening point of the obstacle sensor 7 on the axis of rotation to the contact point with the obstacle 4, and the distance B describes the distance from the fastening point of the soil tillage tool 6 on the axis of rotation to the contact point with the obstacle 4. Moreover, in FIG. 3a the distances A and B are the same, since there is no slope angle ß and thus the vertical direction V runs parallel to the height direction H.

In FIG. 3b, by comparison with FIG. 3a, the soil tillage takes place at a slope angle ß, wherein the slope angle ß describes the angle enclosed between the ground 3 on which the machine 1 is moving and a plane 3e which lies perpendicular to the vertical direction V. The drawing of the machine describes the side of the machine in the transverse Q which faces downhill. Due to the provided correlation of the directions the slope angle ß is also enclosed between the height direction H and the vertical direction V. As a result the axis of rotation D no longer also extends parallel to the vertical direction V, in which the obstacles 4 are arranged and consequently the distances A and B are not the same. In FIG. 3b it has been assumed that the distance B remains the same by comparison with FIG. 3a. Due to the slope angle ß it can be seen that the distance A in FIG. 3b is less than in FIG. 3a, resulting in a path difference ΔQ between the distance A and the distance B. In addition the soil tillage tool 6 may be guided away from the obstacle by the slope angle ß to such an extent that, as it travels in the travel direction F, it would hardly contact the obstacle 4 or even would not contact the obstacle at all. From this can be seen that, by comparison with FIG. 3a, the amount of the pivoting movement about the D axis is less in order to maintain a distance from the obstacle 4. From the context it can be recognized that the adjustment amount S must be decreased in order to guide the soil tillage tool 6 past the obstacle 4 at the same distance as in FIG. 3a. There is preferably also attached to the machine 1 a distance sensor (not shown here) which measures the distance from the machine 1 to the obstacle 4 and the control device (likewise not shown here) controls the soil tillage tool 6 appropriately on the basis of the measured distance and the slope angle ß.

In FIG. 3c the soil tillage again takes place at a slope angle ß but, by comparison with FIG. 3b, FIG. 3c shows the side of the machine 1 facing the hill. As a result, in FIG. 3*c* the axis of rotation D also does not extend parallel to the vertical direction V in which the obstacles 4 are arranged, and consequently the distances A and B are also not the same, again resulting in a path difference ΔQ between the distance A and the distance B. In FIG. 3*c* it has been assumed that the distance A remains the same by comparison with FIG. 3*a*. Due to the slope angle ß it can be seen that the distance B in FIG. 3*c* is less than in FIGS. 3*a* and 3*b*. Accordingly the soil tillage tool 6 runs closer past the obstacle 4 than when it is travelling without a slope angle ß.

From this it can be seen that the amount of the pivoting movement about the D axis must be greater than in FIGS. 3*a* and 3*b* in order not to contact the obstacle 4 during a soil tillage run. It is conceivable that by comparison with travelling on flat ground the adjustment amount S must be increased in order to be able to guide the soil tillage tool past obstacles at the same distance as in FIGS. 3*a* and 3*b*.

It is conceivable that the adjustment amount S corresponds to the path difference ΔQ between the distance A and the distance B. In FIG. 3*a* the distance A and the distance B are the same length, so that an adjustment amount S would preferably be set solely on the basis of the distance of the machine 1 to the obstacle. In FIG. 3*b* the adjustment amount S for the pivoting back then preferably corresponds to the adjustment amount S from FIG. 3*a* minus the path difference ΔQ. Accordingly in FIG. 3*c* the adjustment amount S would then preferably correspond to the adjustment amount S from FIG. 3*a* plus the difference ΔQ.

Since preferably at least one distance, preferably the distance A, must be known in order to be able to set the adjustment amount S depending on the slope angle ß, and the mechanical feeler 7*a* cannot detect the point in the transverse direction Q at which it touches the obstacle 4, it is conceivable that in the embodiment with a mechanical feeler 7*a* at least one further distance sensor (not shown here) is provided which, at the position of the feeler 7*a* on the axis of rotation D, measures the distance A between the axis of rotation D and the obstacle 4. Furthermore, it is conceivable that in an embodiment with a contactless sensor for the obstacle recognition (not shown here), the sensor 7 not only detects an obstacle 4 but also determines the distance A from it.

In a machine 1 which has a soil tillage tool 6 on the hill side and valley side, the adjustment amounts S can preferably be set differently in both soil tillage tools 6. The soil tillage tool 6 which is arranged on the hill side of the machine 1 is then controlled with a different adjustment amount S than the soil tillage tool 6 which is arranged on the valley side of the machine.

Since the soil tillage tool 6 always returns again to its starting position after a specific time or preferably a specific distance, in the extreme case on the side facing the hill it is even possible that the soil tillage tool 6 is already turned forward again into its original position before passing the obstacle 4, so that it collides with the obstacle 4.

FIGS. 3*a* to 3*c* also show the tilting axis K about which the axis of rotation D can be pivoted in the plane consisting of the height direction H and transverse direction Q. In addition, FIG. 3*a* shows the tilting device 14 with a corresponding adjusting element 77. In this case the tilting device 14 is preferably attached so that in the event of extension and/or contraction of the adjusting element 77 the axis of rotation D is pivoted about the tilting axis K. The tilting device 14 is preferably fastened rigidly to the vehicle 2, wherein at least the soil tillage tool 6, but preferably the complete machine 1, is fastened to the tilting device 14 so that it is pivotable about the tilting axis K. The adjusting element 77 preferably limits this degree of freedom in so far as it sets the amount of the pivoting about the tilting axis K.

An adjustment amount S can be set by the adjusting device 10 according to the invention, the regulating device 11 and a sensor which measures the distance A between the machine 1 and the obstacle 4. After detection of the obstacle 4 by the obstacle sensor 7, the soil tillage tool 6 is now pivoted back by the adjustment amount S. Depending upon whether travel is on flat ground or with a slope angle ß, the adjustment amount S is set appropriately on the side of the machine 1 facing towards or away from the hill.

The calculation of the optimal adjustment amount S preferably takes place by the control device 8 according to the signals of the obstacle sensor 7, the current speed of travel of the vehicle 2 in the travel direction F, the current position of the soil tillage tool 6, the slope angle ß and the distance A between the machine 1 and the obstacle 4 in the transverse direction Q. The adjustment amount is calculated according to this parameter so that the pivoting back takes place at a distance from the obstacle 4 which corresponds to the stored distance value.

Figure 4:
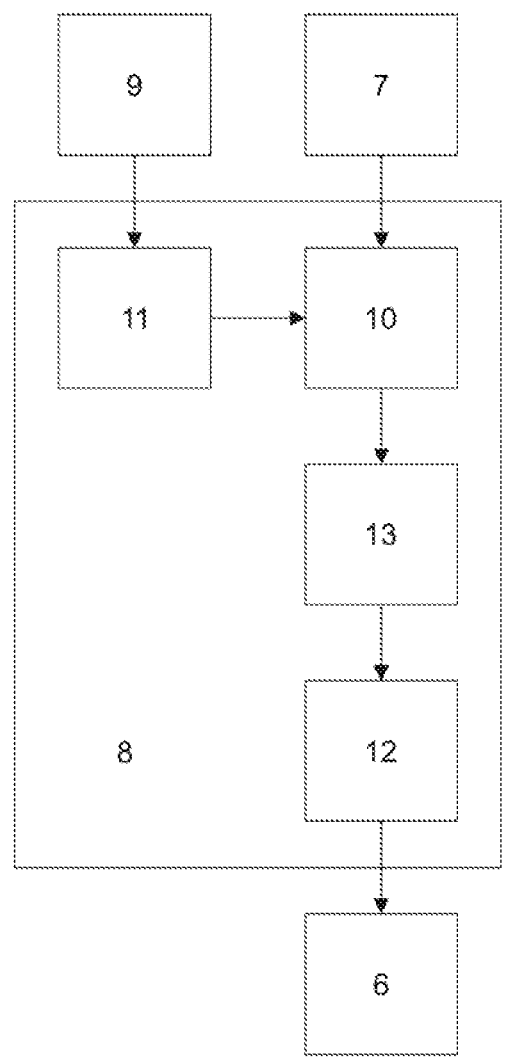
FIG. 4 is an organization chart of the control device 8 with the obstacle sensor 7, the position sensor 9 and the soil tillage tool 6.

The machine 1 preferably comprises a fully automatic regulating device 11 and a position sensor 9. A slope angle ß can be determined by the position sensor 9, wherein the slope angle ß causes a lateral inclination of the machine 1 and the vehicle 2. The detected slope angle ß is then passed on from the position sensor 9 to the control device 8. A corresponding control device 8 is shown schematically in FIG. 4. The control device 8 comprises the adjusting device 10 with the regulating device 11, as well as a signal generator 13 and a moving device 12. The soil tillage tool 6 can be pivoted rearwards by the moving device 12 out of the machining position in the area of soil 3*a* between obstacles 4 into a rest position, which means that the soil tillage tool 6 can be pivoted out of the area 3*a* between two obstacles 4.

The moving device 12 is preferably a hydraulic cylinder. The moving device 12 is controlled by the signal generator 13. Alternatively the moving device 12 can be designed as a shifting unit 12 which shifts the soil tillage tool 6 linearly in the transverse direction Q towards the machine 1 or away from the machine 1. If the signal generator 13 passes a signal to the moving device 12 the soil tillage tool 6 is pivoted out of the region 3*a* between obstacles 4 contrary to the travel direction F. The signal generator 13 is preferably an electromagnetic valve. In this embodiment the obstacle sensor 7 is merely indirectly connected by means of the adjusting device 10 to the signal generator 13. This means that a sensor signal of the obstacle sensor 7 is not passed on directly to the signal generator 13 (which would trigger a pivoting back of the soil tillage tool 6 by the normal pivot amount), but in the adjusting device 10 the sensor signal is first adapted to the slope angle ß before being passed on to the signal generator 13.

The adjustment amount S by which the adjusting device 10 changes the normal pivot amount is determined by the regulating device 11 depending upon the slope angle ß.

The slope angle ß in the transverse direction Q is determined by the position sensor 9. The determined slope angle ß is then passed on to the control device 8 where, depending upon the determined slope angle ß, the current speed of travel of the vehicle in the travel direction F, the distance A between the machine 1 and the obstacle 4, and the current position of the soil tillage tool 6 an adjustment amount S is determined which ensures a pivoting back of the soil tillage tool at a pre-defined distance from the obstacle which corresponds to the set distance value. The measurement of the slope angle ß by the position sensor 9 preferably takes place continuously, so that at any time the optimal adjustment amount S for the current slope angle ß is set by the regulating device 11 in the adjusting device 10 and the soil tillage tool 6 is always guided past the obstacle 4 at the correct distance.

The applicant reserves the right to claim all the features disclosed in the application documents as essential to the invention in so far as they are, individually or in combination, novel over the prior art. Furthermore it is pointed out that features which may be advantageous per se have also been described in the individual drawings. The person skilled in the art recognizes immediately that a specific feature described in a drawing may also be advantageous without the incorporation of further features from this drawing. Furthermore the person skilled in the art recognizes that advantages may also result from a combination of several features shown in individual drawings or in different drawings.

LIST OF REFERENCES 1 machine for soil tillage
2 towing vehicle
3 ground
3a area of soil
3e horizontal, horizontal plane (surface of the earth)
4 obstacles
4a plants
4b plant stick
5 row crop
6 soil tillage tool
7 obstacle sensor
7a mechanical feeler
7b contactless sensor
8 control device
9 position sensor
10 adjusting device
11 regulating device
11a regulator
12 moving device
13 signal generator
14 tilting device
77 adjustment element of the tilting device
A distance of axis of rotation from obstacle at the height of the feeler
A distance of axis of rotation from obstacle at the height of the soil tillage tool
D axis of rotation
F direction of travel
H height direction
K tilting axis
Q transverse direction
S adjustment amount
V vertical direction
B slope angle or plumb angle
ΔQ difference from A to B While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

The embodiments of the invention in which an exclusive property or privilege is claimed are defined as follows:

1. Machine for soil tillage to be arranged on a towing vehicle, wherein when the towing vehicle is travelling in a travel direction (F) an area of soil can be tilled with a soil tillage tool in an intermediate space between at least two obstacles, wherein the machine has a control device with which the soil tillage tool is pivotable into and out of the intermediate space and/or is movable in a transverse direction (Q) towards the machine and/or away from the machine into the intermediate space, wherein the control device comprises an adjusting device which causes the soil tillage tool to pivot in and out and/or to move in the transverse direction (Q) by an adjustment amount (S) after detection of an obstacle, characterized in that the control device further includes a regulating device which assigns an adjustment amount (S) to a value measured by a position sensor and transmits this adjustment amount (S) to the adjusting device, wherein the value measured by the position sensor is an angle of inclination which corresponds to a slope angle (ß), which exists between the transverse direction (Q) and a horizontal plane, wherein this horizontal plane exists orthogonally to a perpendicular vertical direction (V), which arises from the center of the earth, or which angle corresponds to a plumb angle (ß) which exists between the vertical direction (V) and a height direction (H) perpendicular to the transverse direction (Q).

2. Machine for soil tillage according to claim 1, characterized in that the control device comprises a moving device, by which the soil tillage tool is pivotable and/or is movable in the transverse direction (Q), and furthermore comprises a signal generator which is controllable by the adjusting device and by which the moving device is controllable, wherein the signal generator is merely connected indirectly by means of the adjusting device to an obstacle sensor.

3. Machine for soil tillage according to claim 1, characterized in that the moving device of the control device is designed as an adjustment element of a tilting device, by which an axis of rotation (D), which runs orthogonally to the soil tillage tool, can be oriented at an angle, but preferably parallel to the vertical direction (V).

4. Machine for soil tillage according to claim 1, characterized in that the slope angle or plumb angle (ß) can be continuously measured by the position sensor, so that the adjustment amount (S) is automatically and continuously adjustable by the regulating device depending upon the slope angle or plumb angle (ß).

5. Machine for soil tillage according to claim 2, characterized in that, in addition to the signals of the position sensor and of the obstacle sensor also the current speed of travel of the vehicle, the current position of the soil tillage tool, as well as a distance value between the machine and the obstacles in the transverse direction (Q) are detected in the control device.

6. Machine for soil tillage according to claim 1, characterized in that the adjusting device is controllable by a switching element which can be actuated manually during the soil tillage run, and the adjusting device is designed as an electronic control system.

7. Machine for soil tillage according to claim 5, characterized in that the obstacle sensor is designed as a mechanical feeler, wherein detection of an obstacle takes place when a minimum actuation of the feeler is exceeded.

8. Machine for soil tillage according to claim 7, characterized in that the feeler is designed as a rod which is rotatable from the travel direction (F) into the transverse direction (Q) and parallel to the ground, wherein the minimum actuation corresponds to a minimum angle of rotation about the axis of rotation (D).

9. Machine for soil tillage according to claim 2, characterized in that the obstacle sensor is designed as a contactless sensor.

10. Machine for soil tillage according to claim 2, characterized in that the soil tillage tool and the obstacle sensor are fastened to the axis of rotation (D), resulting in a distance (A) which describes the spacing between a fastening point of the obstacle sensor on the axis of rotation (D) and an obstacle, and a distance (B), which describes the distance between a fastening point of the soil tillage tool on the axis of rotation (D) and an obstacle.

11. Machine for soil tillage according to claim 10, characterized in that, in row crops which grow parallel to the vertical direction (V), a slope angle (ß) brings about a path difference (ΔQ) from the distance (A) to the distance (B), wherein the adjustment amount (S) is determined by the regulating device depending upon the path difference (ΔQ).

12. Method for controlling a soil tillage tool of a machine according to claim 1, comprising the following steps:
   a) setting the adjustment amount (S) by which, when an obstacle is detected during a soil tillage run, the soil tillage tool is pivoted by means of the moving device and/or is moved in the transverse direction (Q);
   b) detecting an obstacle by the obstacle sensor;
   c) pivoting out and/or moving the soil tillage tool in the transverse direction (Q) to the machine out of the intermediate space depending upon the adjustment amount (S);
   d) pivoting in and/or moving the soil tillage tool in the transverse direction (Q) from the machine into the intermediate space by the control device.

13. Method according to claim 12, characterized in that a slope angle or plumb angle (ß) is continuously measured by the position sensor and the adjustment amount (S) is continuously determined automatically by the regulating device depending upon the slope angle or plumb angle (ß).

14. Method according to claim 13, characterized in that the signal from the position sensor is denoised with at least one filter in order to be able to distinguish uneven ground from an actual change in the slope angle (ß).

15. Method according to claim 12, characterized in that, by comparison with the set adjustment amount (S) during travel on level ground, during travel with a lateral slope angle (ß) the adjustment amount (S) on the side facing away from the slope is decreased with the aid of the regulating device and on the side facing the hill the adjustment amount (S) is increased with the aid of the regulating device.

* * * * *